(12) United States Patent
Simmons

(10) Patent No.: US 10,395,493 B1
(45) Date of Patent: Aug. 27, 2019

(54) SMART TRAY AND METHOD OF USE

(71) Applicant: John Christopher Simmons, Flowood, MS (US)

(72) Inventor: John Christopher Simmons, Flowood, MS (US)

(*) Notice: Subject to any disclaimer, the term of this patent is extended or adjusted under 35 U.S.C. 154(b) by 0 days.

(21) Appl. No.: 15/961,954

(22) Filed: Apr. 25, 2018

Related U.S. Application Data

(60) Provisional application No. 62/489,496, filed on Apr. 25, 2017.

(51) Int. Cl.
*G08B 13/14* (2006.01)
*H04W 84/12* (2009.01)

(52) U.S. Cl.
CPC ............ *G08B 13/14* (2013.01); *H04W 84/12* (2013.01)

(58) Field of Classification Search
CPC ............ G08B 13/1472; G08B 13/1481; G08B 25/10; Y10T 70/5004
See application file for complete search history.

(56) References Cited

U.S. PATENT DOCUMENTS

| | | |
|---|---|---|
| 4,768,021 A | 8/1988 | Ferraro |
| 5,416,472 A | 5/1995 | Torii |
| 5,598,151 A | 1/1997 | Torii |
| 6,301,815 B1 | 10/2001 | Sliwa |
| 6,400,269 B1 | 6/2002 | Savastano |
| 6,568,116 B2 | 5/2003 | Hathaway |
| 7,116,224 B2 | 10/2006 | Mickler |
| 8,207,816 B2 | 6/2012 | Crigger et al. |
| D676,447 S | 2/2013 | Detemple |
| D680,118 S | 4/2013 | Schmelling |
| 9,152,177 B2 | 2/2015 | Feldstein et al. |
| 9,007,170 B2 | 4/2015 | Wall et al. |
| D749,588 S | 2/2016 | Cox |
| D771,052 S | 11/2016 | Zheng et al. |
| 9,495,848 B2 | 11/2016 | Crook |
| 9,680,532 B2 | 6/2017 | Niec et al. |
| 9,706,026 B2 | 7/2017 | Carnevali et al. |
| 9,900,958 B2 | 2/2018 | Fadell et al. |
| 2004/0120112 A1 | 6/2004 | Mullen et al. |
| 2008/0252414 A1* | 10/2008 | Crigger ............ G07C 9/00158 340/5.52 |
| 2009/0033485 A1* | 2/2009 | Naeve ............ H04W 8/005 340/539.23 |

(Continued)

*Primary Examiner* — Hongmin Fan
(74) *Attorney, Agent, or Firm* — Susan B Fentress; Veritay Group, IP

(57) ABSTRACT

This invention further relates to a networking smart tray made of a tray configured to receive an object a sensor positioned to detect the presence of the object within the receptacle; a user interface in communication with the networking microcontroller; and a networking microcontroller configured to receive a sensor input and transmit a command to a smart device through a network connection. This invention further relates to a method to indicate if an object is absent from a networking smart tray, wherein the indication is shown in a selected smart device in communication with the smart tray. This method involves the steps of: providing the networking smart tray as described above, placing the object within or on the smart tray; and removing the object from the smart tray to generate a wireless signal to a selected smart device.

15 Claims, 10 Drawing Sheets

(56) References Cited

U.S. PATENT DOCUMENTS

| | | |
|---|---|---|
| 2011/0175730 A1* | 7/2011 | Stevenson .............. E05B 47/00 |
| | | 340/540 |
| 2011/0233085 A1* | 9/2011 | Goldie .................. A47B 81/00 |
| | | 206/317 |
| 2011/0297578 A1 | 12/2011 | Stiehl et al. |
| 2013/0290591 A1 | 10/2013 | Schwarzkopf et al. |
| 2014/0049904 A1 | 2/2014 | Hume |
| 2014/0360073 A1* | 12/2014 | Stewart ................ F41A 17/063 |
| | | 42/70.11 |
| 2015/0097686 A1 | 4/2015 | Fadell et al. |
| 2015/0318653 A1 | 11/2015 | Carnevali |
| 2015/0332528 A1 | 11/2015 | McGinnis et al. |
| 2016/0134930 A1* | 5/2016 | Swafford .............. A47F 5/0068 |
| | | 725/80 |
| 2016/0195856 A1 | 7/2016 | Spero |
| 2017/0074617 A1* | 3/2017 | Stewart ................ F41C 33/029 |
| 2017/0186287 A1* | 6/2017 | Schlake ............. G08B 13/1472 |

* cited by examiner

SMART TRAY AND METHOD OF USE

CROSS REFERENCE TO RELATED APPLICATIONS

This application is a non-provisional patent application claiming the benefit U.S. provisional patent application Ser. No. 62/489,496 filed 25 Apr. 2017 under 35 U.S.C. 119(e), hereby specifically Incorporated by reference in their entirety.

STATEMENT REGARDING FEDERALLY SPONSORED RESEARCH OR DEVELOPMENT

None

REFERENCE TO SEQUENCE LISTING, A TABLE FOR A COMPUTER PROGRAM LISTING, COMPACT DISC APPENDIX

None.

BACKGROUND OF THE INVENTION

Field of the Invention

The inventive subject matter is a smart tray with wireless connectivity to a smart device. If an object is removed from the smart tray, the smart device receives a command, such as turn on designated lights.

Description of Related Art Including Information Disclosed Under 37 CFR 1.97 and 1.98

Various enclosures are known to hold firearms, with the primary purpose to prevent unauthorized use. For example, U.S. Pat. No. 6,568,116 to Hathaway discloses a system for the secure containment of a firearm, in a repository, which for the containment of a firearm is an enclosed container structure having an operable drawer for storing one or more firearms of that type; or in the case of storage for long-barreled firearms, such as rifles or shotguns, contains an enclosure operating in conjunction with a rifle rack for securely preventing access to and removal of the firearm by anyone other than the lawful owner of the firearm. The opening of the repository containing the firearm generates a signal through an alarm system at a location which is remote from the repository, such as at a police station, security service or similar law enforcement agency, that access to the contents of the repository, in effect, possible removal of the firearm contained therein, has been carried out under a certain condition; for example, intentionally by the owner, or under duress or emergency state in which the owner of the firearm is subjected to or expects an unlawful or criminal entry to the locale of the firearm repository.

However, the use of a locking mechanism may degrade the usefulness of a firearm in an emergency. Another category of firearm safety enclosures includes storage arrangements for firearms that provide an alarm or notifying system which provide the authorized user with a notification of some type when a stored firearm is accessed, such as a safe with an alarm. U.S. Pat. No. 9,495,848 issued to Crook discloses an interface between an alarm or monitoring system and an object such as a firearm. The interface allows rapid access to the object and cooperates with an alarm or monitoring system to provide immediate notification when the object is moved from its stored position. The interface body for the firearm uses two sets of ferromagnetic components called the "first" and "second" lead. These are activated on a transition of the firearm from the first to the second lead. The "interface body" for the firearm utilizing two sets of ferromagnetic components called the "first" and "second" lead (referred to as the "split ring magnetic probe"). However, not all firearms are completely metallic. For example, GLOCKS have frames and grips made from lightweight polymers. Therefore, a need exists in the industry for a container which is adaptable to a wide-range of firearms and facilitates, rather than potentially impedes, a response in an emergency. Additionally, such a container can be used with other objects for other purposes.

BRIEF SUMMARY OF THE INVENTION

The inventive subject matter relates to a networking smart tray made of: a tray configured to receive an object; a sensor positioned to detect the presence of the object within or on the tray; a user interface in communication with a wireless networking microcontroller. The wireless networking microcontroller is configured to receive a sensor input and transmit a command to a smart device through a network connection. This invention further relates to a method to indicate if an object is absent from a networking smart tray, wherein the indication is shown in a selected smart device in communication with the smart tray. This method involves the steps of: providing the networking smart tray as described above, placing the object within or on the smart tray; and removing the object from the smart tray to generate a wireless signal to a selected smart device, indicating for example an alarm condition.

This invention further relates to a method to use a smart tray to provide self-defense assistance to a user comprising the steps of: providing the smart tray; searching for a remote relay if the remote relay is detected; providing an indicator to a user interface of the smart tray of the remote relay detection; effecting an idle state of the electrical system of the smart tray; receiving an input from the user interface to activate the smart tray if a firearm is not detected by the sensor of the smart tray; effecting an alarm; and triggering an event.

BRIEF DESCRIPTION OF SEVERAL VIEWS OF THE DRAWING(S)

The invention can be best understood by those having ordinary skill in the art by reference to the following detailed description when considered in conjunction with the accompanying drawings in which.

DETAILED DESCRIPTION OF THE INVENTION

Figure 1:
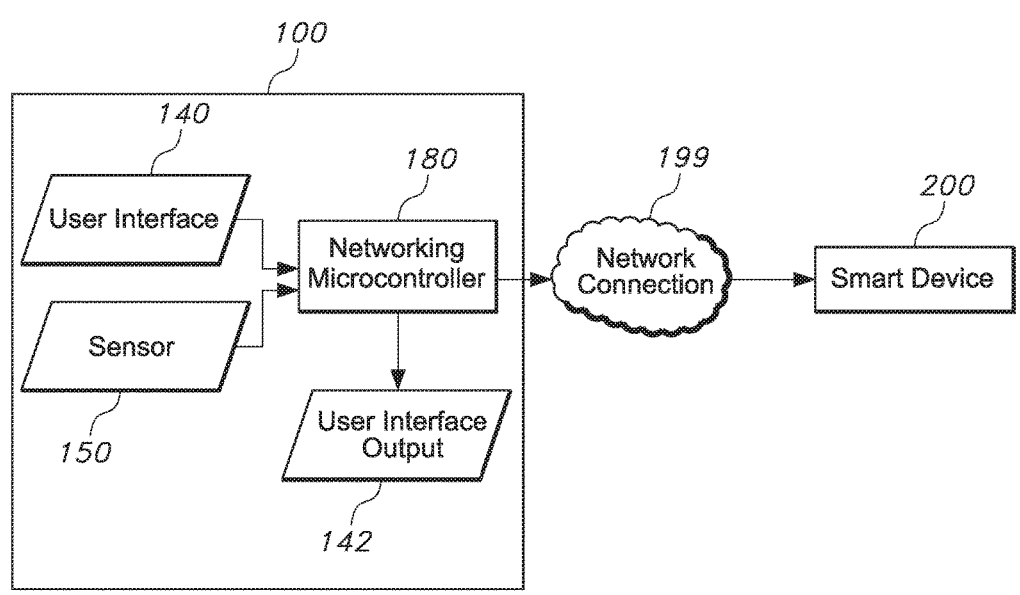
FIG. 1 is a high-level flow chart of the smart tray and its method of operation.

The present invention may be understood more readily by reference to the following detailed description of the invention. It is to be understood that this invention is not limited to the specific device, methods, conditions or parameters described herein, and that the terminology used herein is for describing embodiments by way of example only and is not intended to be limiting of the claimed invention. Also, as used in the specification including the appended claims, the singular forms "a," "an," and "the" include the plural, and reference to a numerical value includes at least that value, unless the context clearly dictates otherwise. Similarly, when values are expressed as approximations, by use of the antecedent "about," it will be understood that the value forms another embodiment.

These and other aspects, features and advantages of the invention will be understood regarding the detailed description herein, and will be realized by means of the various elements and combinations particularly pointed out in the appended claims. It is to be understood that both the foregoing general description and the following detailed description of the invention are exemplary and explanatory of preferred embodiments of the inventions and are not restrictive of the invention as claimed. Unless defined otherwise, all technical and scientific terms used herein have the same meaning as commonly understood by one of ordinary skill in the art to which this invention belongs. Reference will now be made in detail to the presently preferred embodiments of the invention, examples of which are illustrated in the accompanying drawings. Throughout the following detailed description, the same reference numerals refer to the same elements in all figures.

Figure 2:
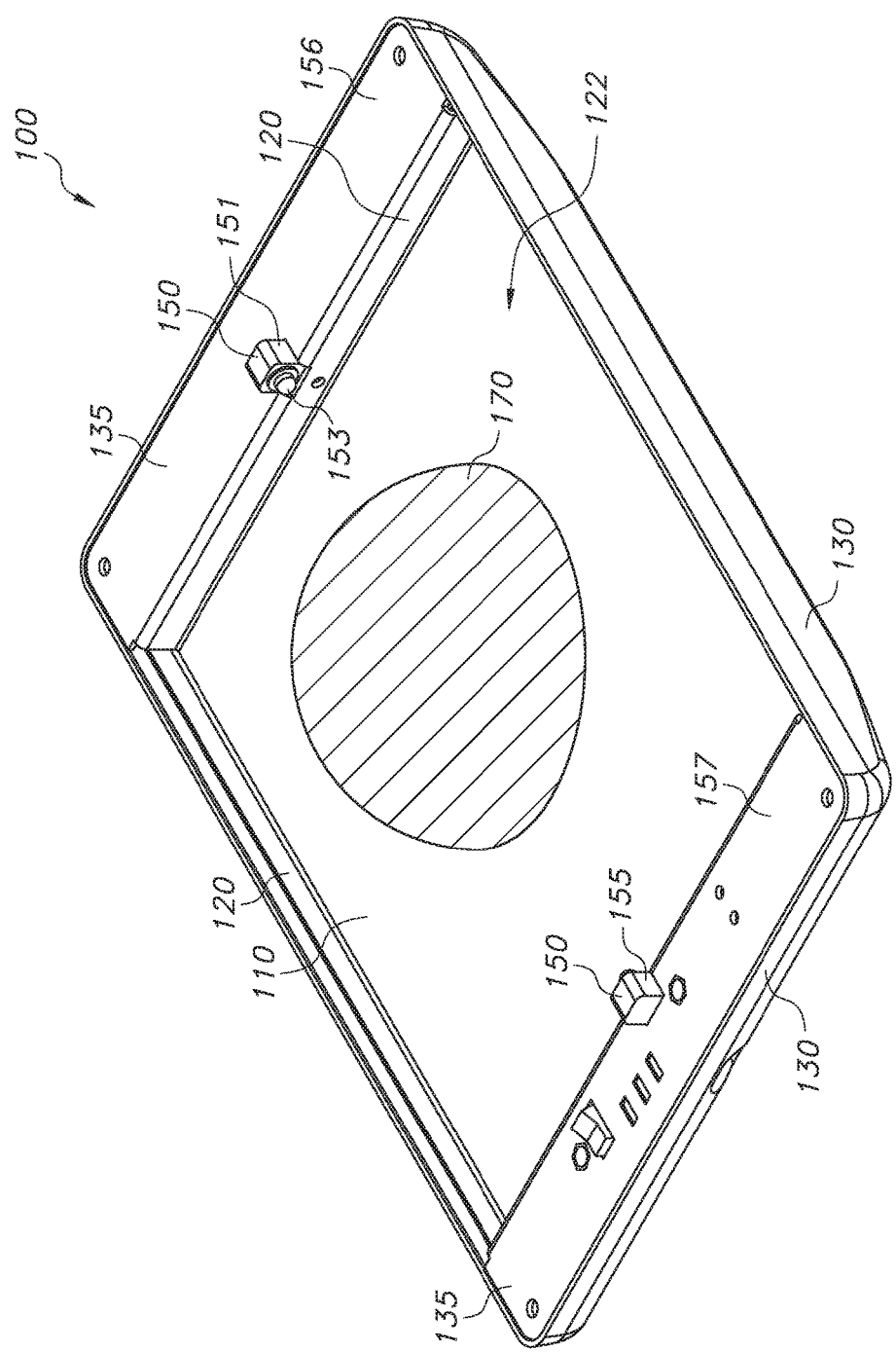
FIG. 2 is an isometric view of the base plate of the smart tray.
Figure 3A:
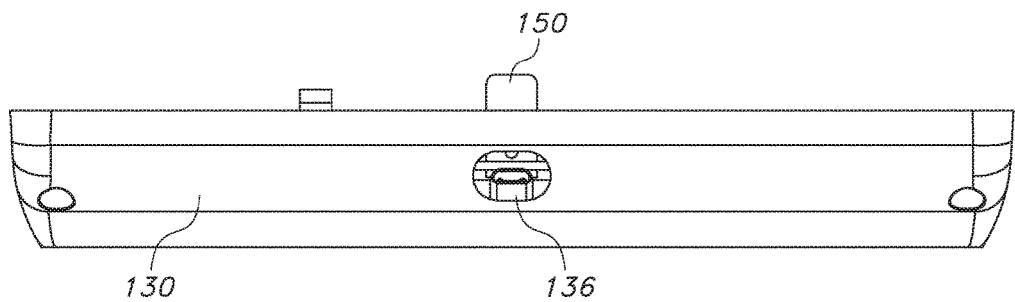
FIG. 3A is a left end view of the smart tray.
Figure 3B:
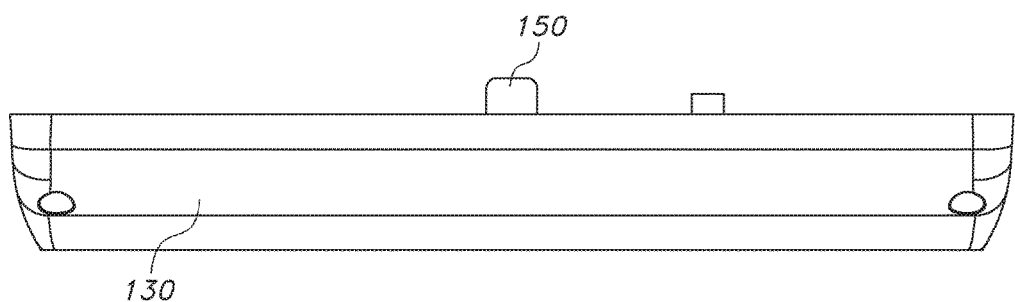
FIG. 3B is a right end view of the smart tray.
Figure 3C:
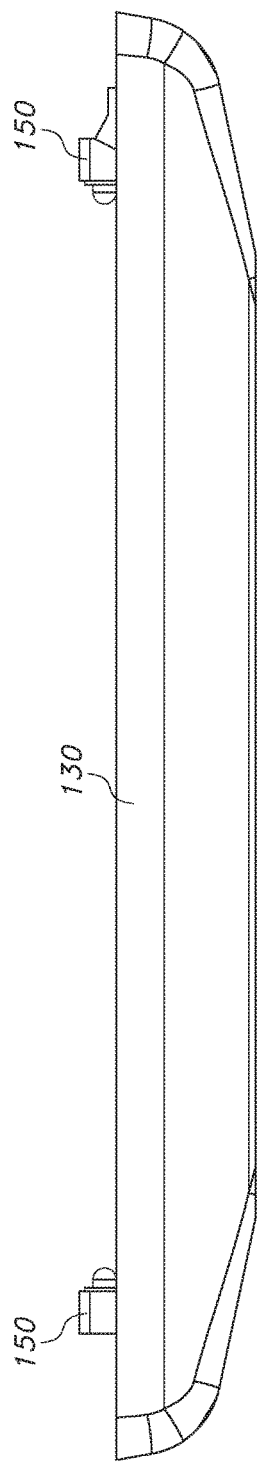
FIG. 3C is a side view of the smart tray.

Referring to FIGS. 1-2 a networking smart tray 100 configured to receive an object 170, is provided. The networking smart tray 100 includes: a user interface 140; a sensor 150 positioned to detect the presence of the object 170 positioned within the smart tray 100; and a wireless networking microcontroller 180 configured to receive sensor input and transmit a command to a smart device 200 through a network connection 199 to a smart device 200.

Now referring to FIGS. 2-3A-3C, an illustrative embodiment is provided showing a smart tray 100. The smart tray 100 is made of a recessed base 110 and a plurality of interior walls 120. The height of the interior wall 120 being of sufficient height to retain an object 170 placed on the base 110. The area between the base 110 and a plurality of interior walls 120 is called the receptacle 122. A frame 130 can enclose the base 110 and a plurality of interior walls 120. At least one platform 135 in the same plane as the bottom surface 110 is integral with or positioned on the frame 130. The frame 130 forms the four exterior sides of the smart tray 100. The frame 130 in an exemplary embodiment is rectangularly shaped. The smart tray 100 also includes a power source such as a battery or wired electrical connection 136. The smart tray 100 includes a sensor 150 to detect the presence or absence of an object 170 within receptacle 122.

The smart tray 100 can be configured to use several types of sensors. It is important to note that the object 170 does not contact any of the walls 120 of the smart tray 100. Nor does the object electrically connect to the sensor 150. In one exemplary embodiment, the photoelectric sensor 150 provides an "array" of sensor elements, with the selection of sensor elements variable by object geometry. Such sensors for example can include: retroreflective photo eyes and inductive proximity sensor(s). The object 170 in the preferred embodiment is a firearm; however, the smart tray 100 receptacle 122 can accommodate other objects such as glasses or keys.

In one exemplary embodiment, the sensor 150 is positioned in the smart tray 100 to detect a change in light intensity. Typically, this means either non-detection or detection of the sensor's emitted light source. The type of light and method by which the target is detected varies depending on the sensor. Photoelectric sensors provide three primary methods of target detection: diffused, retro-reflective and thru-beam, with variations of each.

In one illustrative embodiment, the sensor 150 is a photoelectric sensor. A retroreflective photo eyes incorporates the transmitter and receiver at the same location. The sensor 150 uses a reflective object, such as a mirror or silver surface, to reflect the inverted light beam from the transmitter to the receiver. In this way, the weapon will have sensed when the light beam is interrupted and thus fails to reach the receiver. Such a beam can be in a variety of optical bands (wavelengths), but the infrared band is typically used as it is relatively immune to changes in ambient light conditions. The sensor 150 will register its state via a discrete electrical signal to the microcontroller. The physical adaptation of the smart tray 100 to incorporate a retroreflective sensor would include altering the mounting of the sensor within the tray and adding a reflective surface on the opposite side of the tray in such a manner as to allow the object 170 to interrupt the beam. The sensor 150 positioned in a smart tray 100 detects a change in light intensity. An at least one portion of the sensor 150 is disposed within the interior wall 120 or is positioned on the at least one platform 135 of the smart tray 100.

Figure 4:
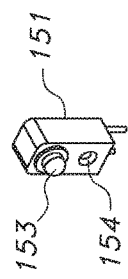
FIG. 4 is an isometric view of the smart tray with one embodiment of the sensor.
Figure 4:
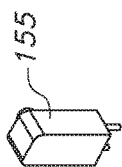
Figure 5:
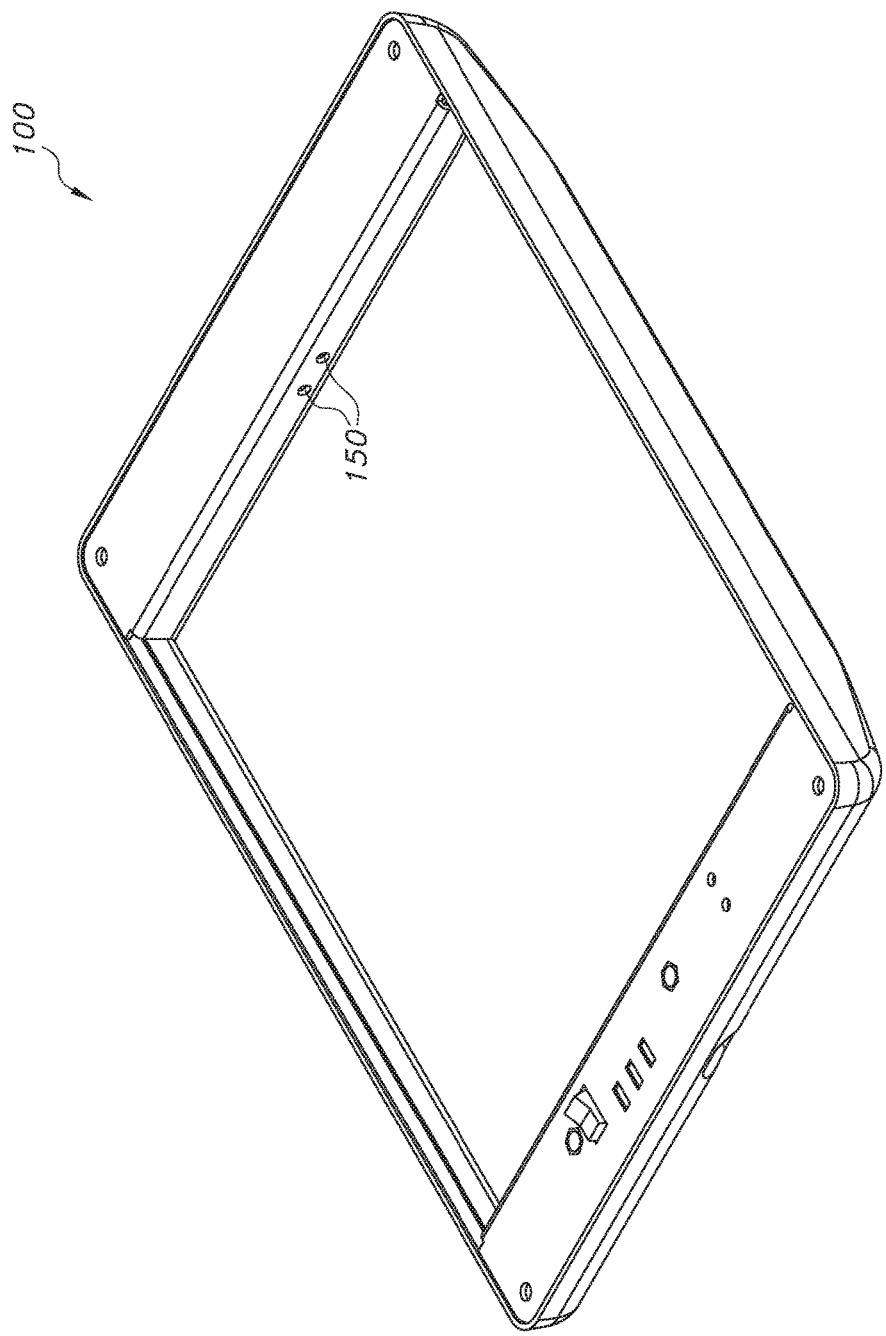
FIG. 5 is an isometric view of the smart tray with one embodiment of the sensor.

This illustrative embodiment is shown in FIGS. 2 and 4-5 a retro-reflective optical sensor, which can be mounted on small circuit board. The transmitter 153 and receiver 154 are in the same housing 151, but a reflector 155 is used to reflect the light from the transmitter 153 back to the receiver 154. In this illustrative embodiment, the sensor 150 is a photoelectric sensor of a retro-reflective optical sensor made of a transmitter 153 and a receiver 153 positioned on a first platform 156 and a reflector 155 configured to reflect light to the receiver 154 positioned on a second platform 157.

Figure 6:
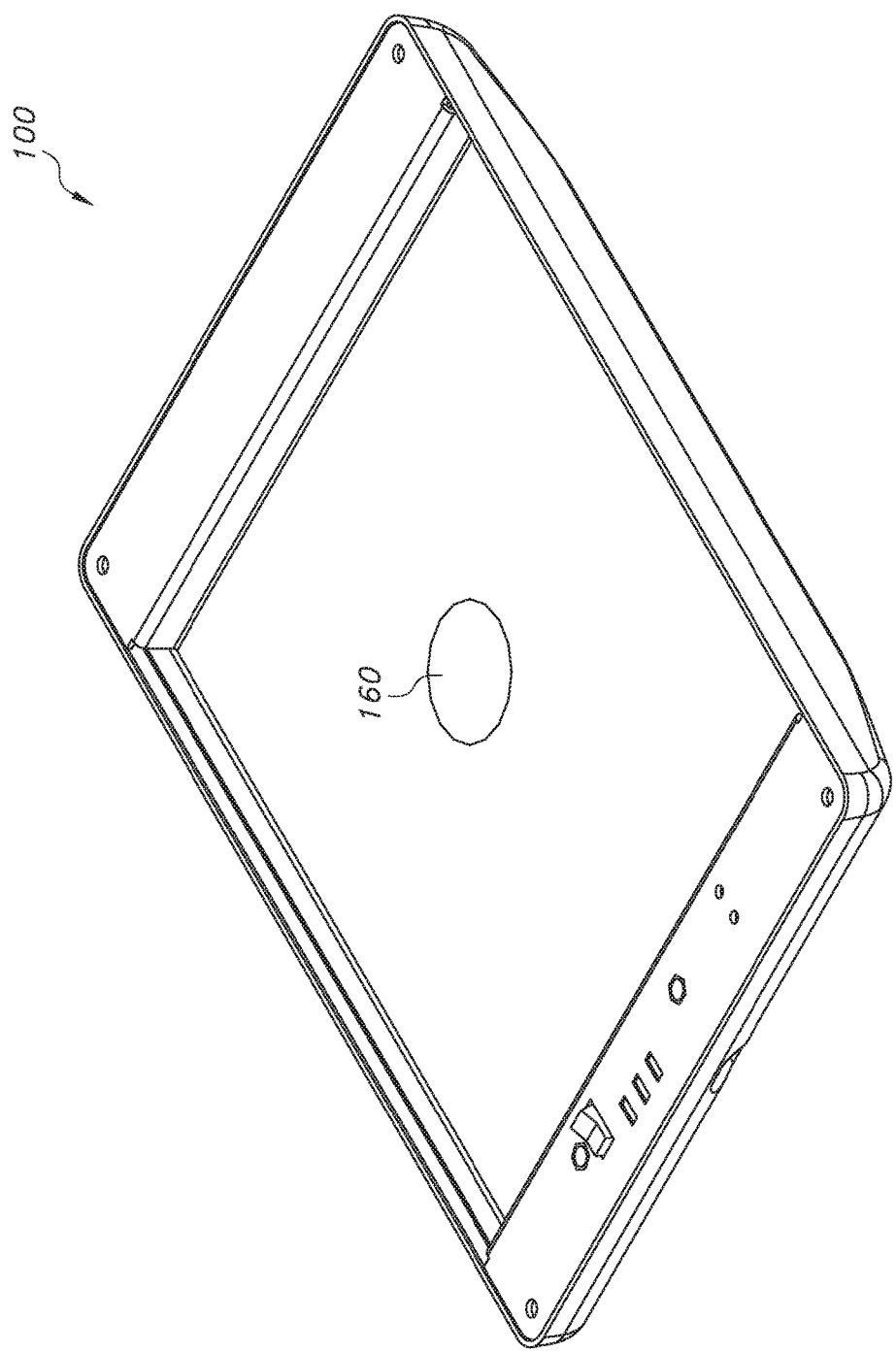
FIG. 6 is an isometric view of the smart tray with one embodiment of the sensor.

Now referring to FIG. 6, in one exemplary embodiment, an inductive proximity sensor 160 is used to detect ferrous metals, such as iron and steel. The inductance of the loop changes according to the material inside it and since metals are much more effective inductors than other materials the presence of metal increases the current flowing through the loop. This change can be detected by sensing circuitry. The sensor 160 will register its state via a discrete electrical signal to the microcontroller. The physical adaptation of the smart tray 100 to incorporate a retroreflective sensor would include provisions to mount the induction coil beneath the plastic surface of the smart tray 100. Such as sensor 160 is largely unaffected by the modest thickness of the tray's surface. In this exemplary embodiment, the smart tray 100 need not have a recessed base.

Figure 7:
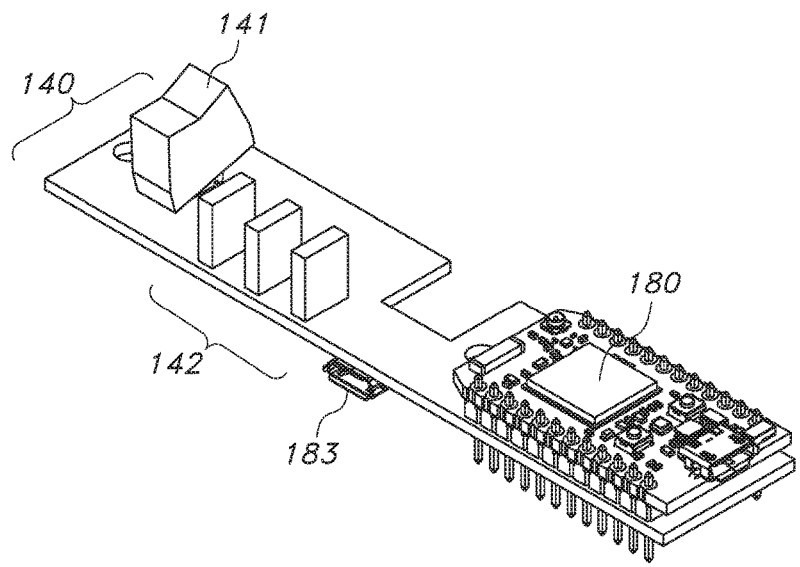
FIG. 7 is a top view of the PCB assembly of the smart tray.

Now referring to FIG. 7, a top view of the printed circuit board "PCB" assembly of the smart tray 100 is shown. The wireless networking microcontroller 180 and various configuration bottoms are shown. A power connector 183 such as a micro USB is provided. The PCB assembly also provides the user interface 140. The user interface includes an input which in this exemplary embodiment is an arm switch 141. The user can input the selected smart device 200. For example, the outside lights and or inside lights in a dwelling.

The user interface includes an output 142 which in this exemplary embodiment is a plurality of indicator lights, such as a light emitting diode or a liquid crystal display. A user interface 140 is connected by the electrical system to the wireless networking microcontroller 180. The wireless networking microcontroller 180 is operatively connected to the user interface input 140. The user interface input 140 can include an analogue switch 141. Additionally, smart tray 100 can include a user interface output 142. In one exemplary embodiment, the user interface output 142 is a plurality of LEDs with designated functions. In another embodiment, the user interface 140 can include a digital user interface for inputting the user requirements. These digital interfaces can be a connection to a cellular phone via Bluetooth or a standard USB port that can connect to an external computer. The user requirements can include: the selection of a power relay to activate certain interior lights or exterior lights in a structure, transmitting a message to the internet and or transmitting a message to a cloud-based server, such as a request for emergency services. The user can specify the required output of the smart tray 100. In an exemplary embodiment, detection system can take two inputs. First, a sensor 150 indicates the presence or absence of an object 170 such as a weapon in the receptacle 122. Second, the user can arm or disarm the system via a switch 141. Based on these inputs, a plurality of LED indicators 142 are used to convey the current state of the system to the user.

Figure 8:
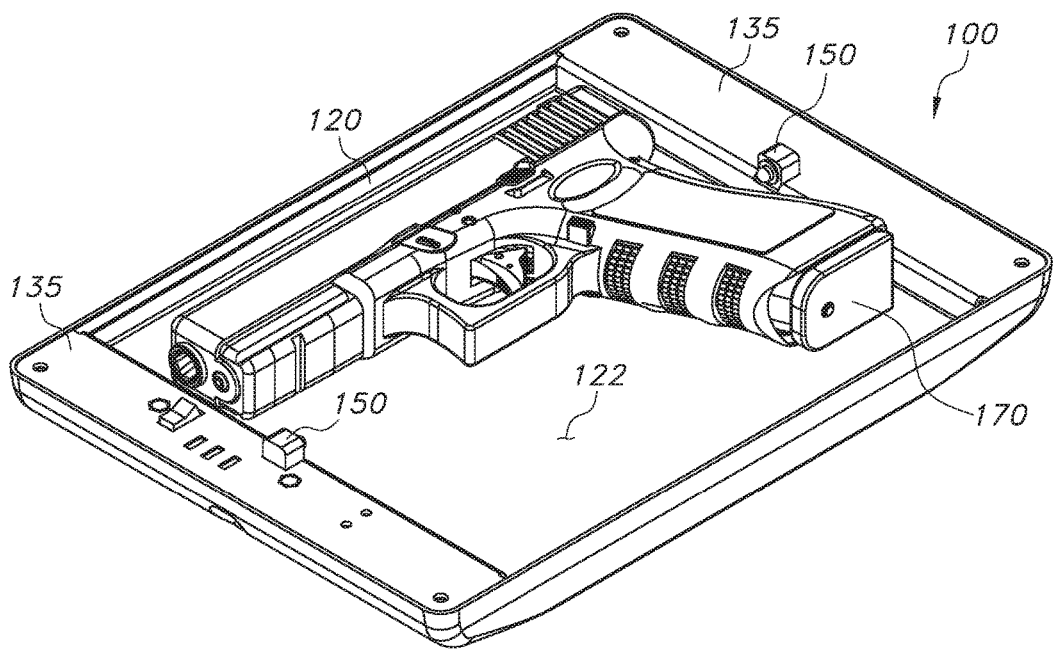
FIG. 8 is an isometric view of the smart tray with a firearm disposed in the tray.

Now referring to FIG. 8 an isometric view of the smart tray 100 with an object 170 is a firearm disposed in the receptacle 122. The smart tray 100 is shown where the object 170 is a firearm. The firearm 170 is positioned within the receptacle 122 of the smart tray 100 and does not contact the sides 120 or the sensor 150. The object 170 such as a firearm can be easily retrieved from the smart tray 100 when needed. In an exemplary embodiment, a weight sensor (not shown) is positioned in the base 110 to activate the smart tray 100 when an object is placed in the base 110.

Figure 9A:
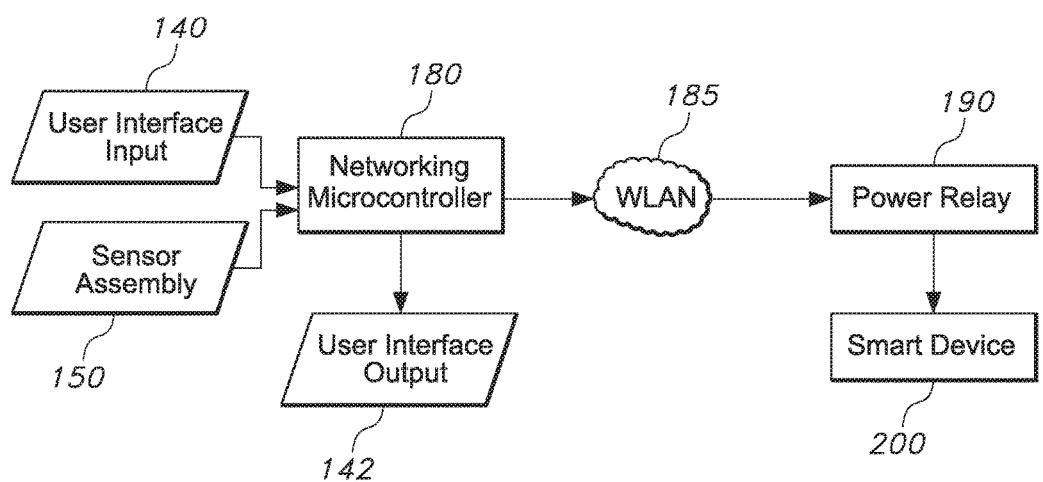
FIG. 9A is a flow chart of the smart tray showing a method to indicate if an object is absent from a networking smart tray

Now referring to FIGS. 1 and 9A-&B, a flow chart of the smart tray 100 showing a high-level diagram of the electrical components is provided. The inventive subject matter is a smart tray 100 with network connection 199 to a smart device 200. If an object 170 is removed from the smart tray 100, the smart device 200 receives a command, such as turn on designated lights. Central to the operation of the smart tray 100 is a wireless networking microcontroller 180. A wireless networking microcontroller 180 is a chip containing the logical elements for performing calculations, carrying out stored instructions, receiving input from switches, from external computers, and from the photo-electric sensors. It is also capable of sending out signal either through various systems, such as wireless local area network WLAN 185 via connected WIFI chip 187.

The wireless networking microcontroller 180 is operatively connected to the sensor 150 to detect the output of the sensor 150. If the wireless networking microcontroller 180 does not detect the presence of the object 170 within the receptacle 122, the networking microcontroller 180 can use its wireless transmitter to communicate with the smart device 200. Exemplary communication systems are shown in FIGS. 9A and 9B; however other communication systems will be developed in the future and can function as shown in FIG. 1.

Now referring to FIG. 9A, in one exemplary embodiment, if an event triggers the system, a control command is sent from the wireless networking enabled networking microcontroller 180 through a Wireless Local Area Network (WLAN) 185 to a power relay 190. The power relay 190 is connected to a smart home appliance. A power relay 190 can be in the form or a WLAN enabled light switch or WLAN power outlet adaptor of a smart device 200. One example of a power relay is an IoT Power Relay.

Figure 9B:
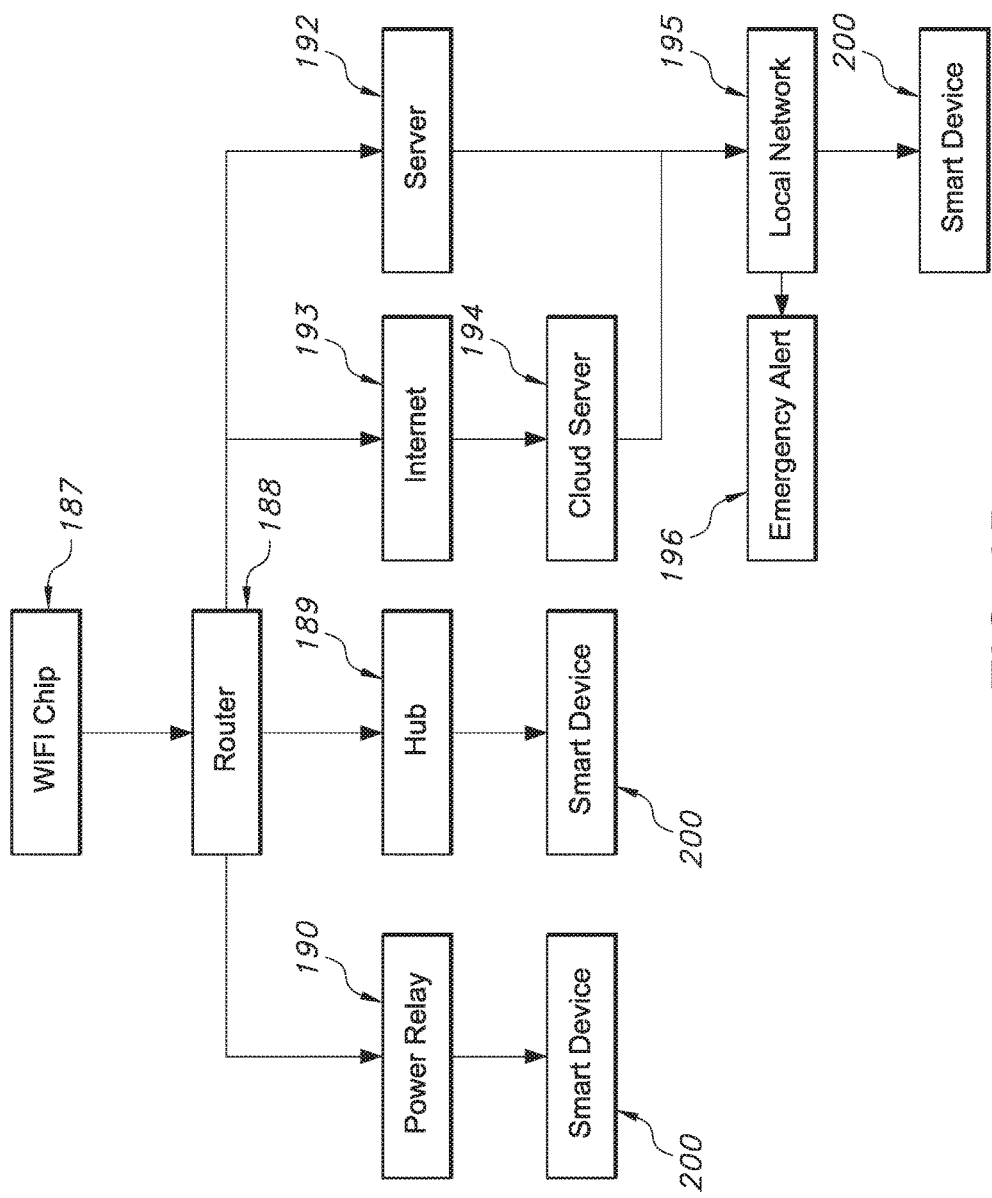
FIG. 9B is a flow chart of the smart tray showing a method to indicate if an object is absent from a networking smart tray.

Now referring to FIG. 9B the smart tray 100 has built-in networking to transmit and receive, if an event triggers the system, via the wireless networking microcontroller 180. The smart device 100 can transmit to any device that has compatible protocols and standards, such as any WIFI router 188 that could pass the signal onto any other device on its network such as a power relay 190 or a home controller or a remote server or an alarm attached to the network. The network would most often be configured to use standard TCP/IP protocols (standard internet protocol) that talks with a router which then passes the signal onto either smart power relay that also talks TCP/IP. By using standard electronic hubs that talk Zigbee or Z-wave, the tray can signal devices that do not talk TCP/IP. The smart tray 100 uses TCP/ip through the router, and the hub translates these commands into Zigbee or Z-Ware to the light bulbs. The network connection 199 in an exemplary embodiment can include a WIFI chip 187, in electronic communication with a router 188. The router 188 can connect to a power relay 190. The WIFI chip 187, can be in electronic communication with a hub 189 that uses Zigbee or Z-wave to talk to a smart device 200 such as smart light bulb. The network connection 199 can include a WIFI chip 187, in electronic communication with a server 192. The server 192 being in communication with a local network 195. The network connection 199 in an exemplary embodiment can include a WIFI chip 187, in electronic communication with the internet 193. The internet 193 can be in contact with the cloud server 194. A cloud server 194 is a logical server that is built, hosted and delivered through a cloud computing platform over the Internet. Cloud servers possess and exhibit similar capabilities and functionality to a typical server but are accessed remotely from a cloud service provider. Since it has built-in networking to transmit and receive, if an event triggers the system, it can transmit to any device that has compatible protocols and standards, such as any WIFI router that could pass the signal onto any other device on its network such as a power relay 190 or a home controller or a remote server or an alarm attached to the network. The network can include: Bluetooth, Zigbee, WeMo, Z-Wave, and others.

In another embodiment, the smart tray 100 is used in conjunction with a wireless RF/Bluetooth transmitter that allows a user to activate lights within or outside the residence by removing the object from the smart tray. In an alternative embodiment, the signal can be transmitted to the internet and then to a cloud-based server to provide an electronic message, such as an alert to authorities, or the signal can be conveyed to a WIFI connected radio and then to the users' local WIFI router. In one exemplary embodiment, the users' local connected smart tray 100, such as a SMART 120 VAC, receptacles are connected to a home security system, or SMART light bulbs are connected to a home virtual assistant, and the smart tray 100.

Figure 10:
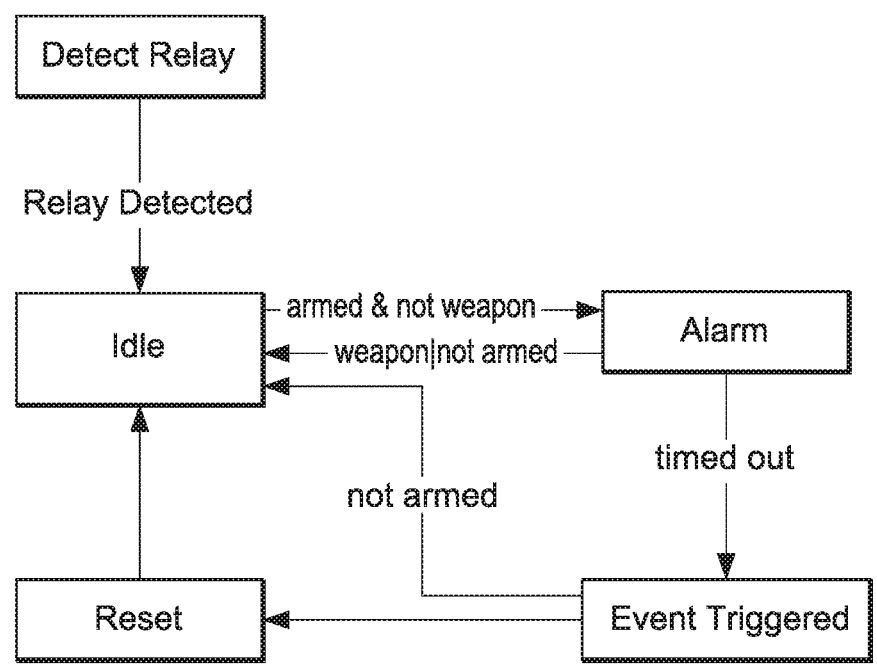
FIG. 10 is a flow chart of the smart tray showing the process of the automatic light activation.

Now referring to FIGS. 8-10, if an object 170 such as a firearm is removed from the base 110, a signal is generated to the microcontroller which then transmits through the local WIFI router to any of an array of devices that are also WIFI enabled. This can be the process used to activate lights within/or outside the structure, such as a residence. The signal can also be passed on to a remote alarm or monitoring system that has a WIFI interface or an input sensor that can be triggered by WIFI. The smart tray 100 is configured to contact authorities within a specified time frame unless an object 170 such as a firearm is placed on or within the smart tray 100 or the smart tray 100 is deactivated. The smart tray 100 is configured to let a user know that the firearm 170 has been removed from the dock by sending alerts to their smartphone or an audible alarm within the smart tray 100. This allows the user to be notified if an object 170 such as a firearm is removed by an unauthorized user.

The smart tray 100 is considered in an armed state if it 1) senses the presences of an object 170 between its beam sensor and 2) the arm switch is in the arm position. If the object 170 such as a weapon is lifted, the beam sensor sees its opposing LED emitter and therefore realize the object 170 such as a weapon has been removed. If the object 170 such as a weapon is removed in the armed state for more than XX continuous seconds, the smart tray 100 will go into an alert state. The alert state will initiate a user networking action to one or more output devices on the same WLAN as the smart tray. Output devices can be a variety of smart home appliances, most notably WLAN enabled light switches and WLAN enabled power outlets. The smart tray 100 can be programmed to turn these devices on or off. Placing the object 170 such as weapon back in the smart try will obstruct the beam sensor and bring the smart tray back into an armed state.

More specifically, the smart tray 100 can include a computer system made of a microcontroller and a non-transitory computer-readable storage medium coupled to the microcontroller, wherein the non-transitory computer-readable storage medium is encoded with computer-readable instructions; wherein when the computer-readable instructions are executed, such that the microcontroller performs the respective functions, that enable the user to show the outline of a specified firearm. The user can the place the fixturing components around the highlighted shape to accommodate a specific firearm.

A wireless networking microcontroller 180 in the smart tray 100, direct a data transmission through a wireless transmitter (WIF) to the receiver of the wireless router. The signal can be transmitted to the internet and then to a cloud-based server to provide an electronic message such as an alert to authorities or the signal can be conveyed to a WIFI connected radio and then to the users' local WIFI router 188. In one exemplary embodiment, the users' local connected smart tray 100, such as a SMART 120 VAC, receptacles are connected to a home security system or SMART light bulbs are connected to a home virtual assistant.

Now referring to FIG. 10, the process begins on powering up the smart tray 100. After being powered on, the smart tray 100 enters the Detect Relay state where it searches for a remote relay on the WLAN. After a remote relay has been detected, the smart tray 100 provides an indicator to the user interface by indicating the connection such as by flashing the connection indication LED. The smart tray 100 then goes immediately into the Idle state. In this state, the weapon indication LED is lit when a weapon is detected; otherwise, the indicator light is off. If the smart tray 100 is armed (activated) and no weapon is detected, the smart tray 100 will enter the Alarm state. Receiving an input from the user interface to activate the smart tray 100. The alarm indicator, such as an alarm LEDs, will begin to flash indicating that the system will trigger the relay to close if the weapon is not returned before the alarm period expires If the weapon is returned or the system is disarmed before the alarm expires the smart tray 100 will return to the Idle state. Otherwise, the smart tray 100 will remain in the Alarm state until the alarm times out. After timing out, the smart tray 100 will enter the Event Triggered state and send the command for the relay to close. The LED indicator 142 that indicates that the relay has been closed will remain illuminated in this state only. If the smart tray 100 is disarmed, it will return to the Idle state. If an object 170 such as a firearm is replaced after the relay has been closed and the system is still armed, the smart tray 100 will enter the Reset state. In the Reset state, the smart tray 100 sends the open command to the relay. From Reset, the system returns immediately to the Idle state.

Equivalent elements can be substituted for the ones set forth above such that they perform in substantially the same manner in substantially the same way for achieving substantially the same result. It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all its material advantages, the form herein before described being merely exemplary and explanatory embodiment thereof. It is the intention of the following claims to encompass and include such changes.

The invention claimed is:

1. A smart tray comprising:
a tray configured to receive and retain an object without a lid, wherein the tray is comprised of a recessed base and a plurality of sides walls perpendicular to the base forming a receptacle, wherein the receptacle is sized to receive the object, without the object engaging any of the plurality of sides of walls of said tray
a frame enclosing the recessed base and the plurality of sides walls;
a first platform and a second platform disposed above the recessed base integral with or positioned on the frame;
a photoelectric sensor positioned on the first platform and the second platform to detect a change in light caused by the presence or absence of the object within the receptacle;
a wireless networking microcontroller comprised of a chip configured to receive a sensor input from the photoelectric sensor and to transmit a signal using a wireless local area network to a power relay through a network connection to a smart device;
and a user interface operatively connected to the wireless networking microcontroller.

2. The smart tray of claim 1 wherein the photoelectric sensor is comprised of a retro-reflective optical sensor having a transmitter and a receiver positioned on the first platform and a reflector configured to reflect light to the receiver positioned on the second platform.

3. The smart tray of claim 1 configured to activate when the object contacts the bottom surface of the receptacle.

4. The smart tray of claim 1 wherein the sensor is an inductive proximity sensor.

5. The smart tray of claim 1 wherein the sensor is a photoelectric sensor selected from the group consisting of: diffused, retro-reflective and thru-beam sensor.

6. The smart tray of claim 1 wherein in the object is a firearm.

7. The smart tray of claim 1 wherein the user interface comprises: a user input and a user output wherein the user interface output is an indicator light.

8. The smart tray of claim 1 wherein the power relay is a WLAN enabled light switch.

9. The smart tray of claim 1 wherein the power relay is a WLAN power outlet adaptor of a smart device.

10. A method to use a smart tray to provide self-defense assistance to a user comprising the steps of:
providing a smart tray configured to receive and retain a firearm without a lid, wherein the smart tray is comprised of a recessed base and a plurality of sides walls perpendicular to the base forming a receptacle, wherein the receptacle is sized to receive the firearm, without the firearm engaging any of the plurality of sides of walls of said tray a photoelectric sensor positioned to detect a change in light caused by the presence or absence of the object within the tray receptacle; a wireless networking microcontroller comprised of a chip configured to receive a sensor input from the photoelectric sensor and to transmit a signal using a wireless local area network to a device; and a user interface operatively connected to the wireless networking microcontroller;
receiving an input from the user interface to activate the smart tray, if a firearm is not detected by the sensor in the receptacle of the smart tray,
transmitting a command to a compatible device; wherein the compatible device is a router;
transmitting a command from the compatible device to a power relay and
triggering an event, wherein the event is the step of: activating designated lights inside or outside of a structure.

11. The method of claim 10 further comprising the step of effecting an alarm upon the occurrence of a triggering event.

12. The method of claim 10 wherein the event is the step of transmitting a message to an internet.

13. The method of claim 10 further comprising the step of transmitting a message to a cloud-based server.

14. The method of claim 10 comprising the step of: transmitting a command to a WLAN enabled light switch.

15. The method of claim 10 comprising the step of: transmitting a command to a WLAN power outlet adaptor of a smart device.

* * * * *